United States Patent
Chen et al.

(10) Patent No.: US 12,175,777 B2
(45) Date of Patent: Dec. 24, 2024

(54) SYSTEMS AND METHODS FOR FASHION ACCESSORY EVALUATION

(71) Applicant: Perfect Mobile Corp., New Taipei (TW)

(72) Inventors: Ya Hsuan Chen, Taichung (TW); Ming-Chun Ko, Taichung (TW)

(73) Assignee: PERFECT MOBILE CORP., New Taipei (TW)

( * ) Notice: Subject to any disclaimer, the term of this patent is extended or adjusted under 35 U.S.C. 154(b) by 183 days.

(21) Appl. No.: 18/055,923

(22) Filed: Nov. 16, 2022

(65) Prior Publication Data

US 2023/0252805 A1 Aug. 10, 2023

Related U.S. Application Data

(60) Provisional application No. 63/308,795, filed on Feb. 10, 2022.

(51) Int. Cl.

| | |
|---|---|
| *G06Q 30/0601* | (2023.01) |
| *G06T 5/77* | (2024.01) |
| *G06T 7/50* | (2017.01) |
| *G06T 7/60* | (2017.01) |
| *G06T 11/60* | (2006.01) |
| *G06V 10/60* | (2022.01) |
| *G06V 20/66* | (2022.01) |

(52) U.S. Cl.
CPC ......... *G06V 20/66* (2022.01); *G06Q 30/0643* (2013.01); *G06T 5/77* (2024.01); *G06T 7/50* (2017.01); *G06T 7/60* (2013.01); *G06T 11/60* (2013.01); *G06V 10/60* (2022.01)

(58) Field of Classification Search
CPC ........ G06Q 30/0643; G06T 5/77; G06T 11/60
See application file for complete search history.

(56) References Cited

U.S. PATENT DOCUMENTS 9,813,693 B1 * 11/2017 Baldwin .............. H04N 13/239
9,892,561 B2    2/2018 Choukroun et al.
(Continued)

FOREIGN PATENT DOCUMENTS

CN          112084398 A       12/2020
CN          112102148 A       12/2020
(Continued)

OTHER PUBLICATIONS

Wei_CN112084298—EPO translated (Year: 2020).*
(Continued)

*Primary Examiner* — Sing-Wai Wu
(74) *Attorney, Agent, or Firm* — McClure, Qualey & Rodack, LLP

(57) ABSTRACT

A computing device obtains an image of a user and detects at least one fashion accessory depicted in the image. The computing device determines a fashion accessory category for each of the at least one detected fashion accessory and retrieves at least one candidate fashion accessory associated with the accessory category from a data store. The computing device determines attributes of the fashion accessory and a replacement fashion accessory and performs virtual application of the replacement fashion accessory on the user based on the attributes of the fashion accessory and the replacement fashion accessory.

20 Claims, 11 Drawing Sheets

(56) References Cited

U.S. PATENT DOCUMENTS

| | | | |
|---|---|---|---|
| 10,083,521 B1* | 9/2018 | Dhua | G06Q 30/0603 |
| 10,810,647 B2 | 10/2020 | Jain et al. | |
| 11,100,560 B2 | 8/2021 | Parker et al. | |
| 2020/0364839 A1 | 11/2020 | Zhang et al. | |
| 2021/0064910 A1 | 3/2021 | Meier et al. | |
| 2021/0366147 A1 | 11/2021 | Tolani et al. | |
| 2023/0230292 A1* | 7/2023 | Ivanov | G06V 10/82 |
| | | | 345/633 |
| 2023/0401460 A1* | 12/2023 | Mahesh Badari Narayana Gupta | G06V 40/161 |

FOREIGN PATENT DOCUMENTS

| | | |
|---|---|---|
| CN | 112102149 A | 12/2020 |
| CN | 112489184 A | 3/2021 |
| JP | 2019-046428 A | 3/2019 |
| KR | 102060972 B1 | 12/2019 |
| KR | 102153409 B1 | 9/2020 |
| KR | 102153410 B1 | 9/2020 |
| KR | 102255404 B1 | 5/2021 |

OTHER PUBLICATIONS

Singh, V., et al.; "A Comparative Experiment In Classifying Jewelry Images Using Convolutional Neural Networks;" Science & Technology Asia; vol. 23; No. 4 Oct.-Dec. 2018; pp. 1-11; ttps://tci-thaijo.org/index.php/SciTechAsia.

Yang, Y.I., et al.; "Virtual Try-On Of Footwear In Mixed Reality Using Depth Sensors;" VRCAI '13: Proceedings of the 12th ACM SIGGRAPH International Conference on Virtual-Reality Continuum and Its Applications in Industry; Nov. 2013; pp. 309-312; https://doi.org/10.1145/2534329.2534376.

Shirkhani, S.; "Image-Based Fashion Recommender Systems: Considering Deep learning role in computer vision development;" Master Programme in Data Science: Lulea University of Technology; 2021; pp. 1-79.

"Fashion Accessories Using Virtual Mirror;" Sep. 2020; pp. 1-10; https://www.seminarsonly.com/Engineering-Projects/Computer/fashion-accessories.php.

* cited by examiner

SYSTEMS AND METHODS FOR FASHION ACCESSORY EVALUATION

CROSS-REFERENCE TO RELATED APPLICATION

This application claims priority to, and the benefit of, U.S. Provisional patent application entitled, "Accessory replacement system," having Ser. No. 63/308,795, filed on Feb. 10, 2022, which is incorporated by reference in its entirety.

TECHNICAL FIELD

The present disclosure generally relates to systems and methods for evaluating fashion accessories.

SUMMARY

In accordance with one embodiment, a computing device obtains an image of a user and detects at least one fashion accessory depicted in the image. The computing device determines a fashion accessory category for each of the at least one detected fashion accessory and retrieves at least one candidate fashion accessory associated with the accessory category from a data store. The computing device determines attributes of the fashion accessory and a replacement fashion accessory and performs virtual application of the replacement fashion accessory on the user based on the attributes of the fashion accessory and the replacement fashion accessory.

Another embodiment is a system that comprises a memory storing instructions and a processor coupled to the memory. The processor is configured by the instructions to obtain an image of a user and detect at least one fashion accessory depicted in the image. The processor is further configured by the instructions to determine a fashion accessory category for each of the at least one detected fashion accessory and retrieve at least one candidate fashion accessory associated with the accessory category from a data store. The processor is further configured by the instructions to determine attributes of the fashion accessory and a replacement fashion accessory and perform virtual application of the replacement fashion accessory on the user based on the attributes of the fashion accessory and the replacement fashion accessory.

Another embodiment is a non-transitory computer-readable storage medium storing instructions to be implemented by a computing device. The computing device comprises a processor, wherein the instructions, when executed by the processor, cause the computing device to obtain an image of a user and detect at least one fashion accessory depicted in the image. The processor is further configured by the instructions to determine a fashion accessory category for each of the at least one detected fashion accessory and retrieve at least one candidate fashion accessory associated with the accessory category from a data store. The processor is further configured by the instructions to determine attributes of the fashion accessory and a replacement fashion accessory and perform virtual application of the replacement fashion accessory on the user based on the attributes of the fashion accessory and the replacement fashion accessory.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure are better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Figure 1:
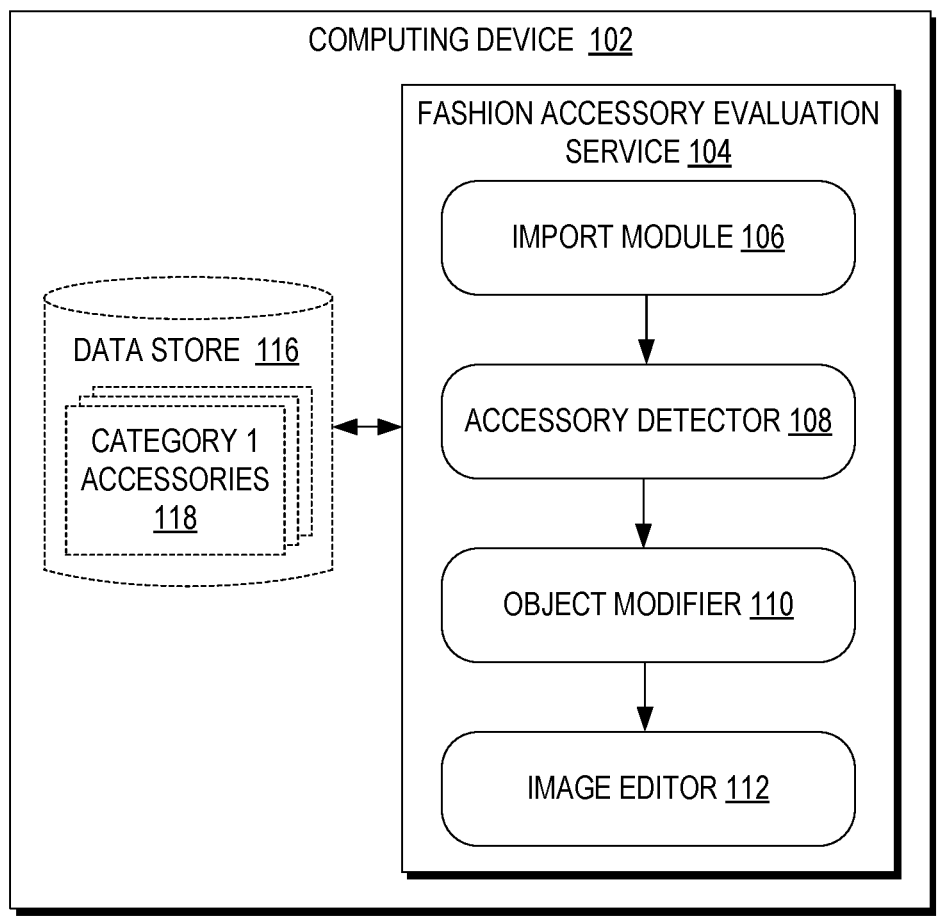
FIG. 1 is a block diagram of a computing device configured to provide an accessory evaluation service according to various embodiments of the present disclosure.

The subject disclosure is now described with reference to the drawings, where like reference numerals are used to refer to like elements throughout the following description. Other aspects, advantages, and novel features of the disclosed subject matter will become apparent from the following detailed description and corresponding drawings.

Consumers have access to a wide selection of fashion accessories through department stores, online retailers, and so on. However, purchasing fashion accessories can be costly and trying on fashion accessories can also be time consuming. Therefore, there is a need for an improved cost-effective platform that allows consumers to efficiently evaluate a variety of fashion accessories. The present disclosure is directed to systems and methods for providing an accessory evaluation service that detects the presence of one or more fashion accessories currently worn by an individual depicted in an image. In example embodiments, the accessory evaluation service retrieves candidate fashion accessories based on the detected fashion accessories and presents the candidate fashion accessories to the individual. The individual is then able to select a new fashion accessory and replace the fashion accessory currently worn by the individual, thereby allowing the individual to try on new fashion accessories without actually purchasing the fashion accessories.

A description of a system for implementing an accessory evaluation service is described followed by a discussion of the operation of the components within the system. FIG. 1 is a block diagram of a computing device 102 in which the embodiments disclosed herein may be implemented. The computing device 102 may comprise one or more processors that execute machine executable instructions to perform the features described herein. For example, the computing device 102 may be embodied as a computing device such as, but not limited to, a smartphone, a tablet-computing device, a laptop, and so on.

A fashion accessory evaluation service 104 executes on a processor of the computing device 102 and includes an import module 106, an accessory detector 108, an object modifier 110, and an image editor 112. The import module 106 is configured to obtain digital images of a user wearing one or more original fashion accessories. The fashion accessory evaluation service 104 allows the user to select other desired fashion accessories to try on in place of the original fashion accessories worn by the user. For some embodiments, the import module 106 is configured to cause a camera (e.g., front-facing camera) of the computing device 102 to capture an image or a video of a user of the computing device 102. Alternatively, the import module 106 may obtain an image or video of the user from another device or server where the computing device 102 may be equipped with the capability to connect to the Internet.

The images obtained by the import module 106 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. The video may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The accessory detector 108 is configured to detect a fashion accessory currently worn by the user in the image obtained by the import module 106. For some embodiments, the accessory detector 108 performs image semantic segmentation on original fashion accessories depicted in the image of the user and searches a data store 116 for other candidate fashion accessories 118 that fall within the same category. For example, a first category (e.g., "CATEGORY 1") can comprise necklaces while another category can comprise handbags. Yet another category can comprise bracelets. The candidate fashion accessories 118 retrieved by the accessory detector 108 are then presented to the user in a user interface displayed on the computing device 102, thereby allowing the user to select one or more desired fashion accessories to replace fashion accessories currently worn by the user. The accessory detector 108 may comprise an accessory size detection module (not shown) configured to determine size or area attributes of the fashion accessories currently worn by the user. In particular, the accessory size detection module may be configured to determine the area occupied by the fashion accessories currently worn by the user relative to the entire image obtained by the import module 106. For some embodiments, the accessory detector 108 utilizes depth and size information derived by a front-facing camera of the computing device 102 to determine size or area attributes of the fashion accessories currently worn by the user.

The object modifier 110 is configured to obtain a selection from the user of one or more of the candidate fashion accessories 118 where the selection comprises one or more replacement fashion accessories. As the size and shape of the replacement fashion accessory may differ from that of the fashion accessory currently worn by the user, the object modifier 110 analyzes attributes of the detected (original) fashion accessory and of the replacement fashion accessory. For example, the object modifier 110 may be configured to determine a first area occupied by the detected fashion accessory in the image. The object modifier 110 also determines a second area to be occupied by the replacement fashion accessory in the image. In particular, the object modifier 110 determines the second area occupied by the replacement fashion accessory when the replacement fashion accessory is virtually applied to the user in the image. The object modifier 110 then determines a difference between the first area and the second area.

Virtual application of the replacement fashion accessory on the user is then performed by the image editor 112 based on the difference between the first area and the second area. For example, the image editor 112 may perform virtual application of the replacement fashion accessory on the user by covering the detected fashion accessory with the replacement fashion accessory or removing the detected fashion accessory when the second area is greater than the first area. On the other hand, the image editor 112 may perform virtual application of the replacement fashion accessory on the user by removing the detected fashion accessory and performing inpainting in an area around the replacement fashion accessory when the second area is less than the first area. Inpainting generally refers to the process of reconstructing lost or deteriorated parts of images and videos. In this case, since removal of the detected fashion accessory from the image leaves a void larger than the area occupied by the replacement fashion accessory, inpainting is performed to reconstruct portions of the image when voids still exist after the replacement fashion accessory is virtually applied to the user. The voids may exist on portions of the user and/or the background region of the image. For some embodiments, the image editor 112 performs virtual application of the replacement fashion accessory on a segment-by-segment basis within the image where each segment has a predetermined size. For example, each segment may be defined according to a predetermined number of pixels.

Other attributes analyzed by the object modifier 110 may include lighting attributes of the detected fashion accessory in the image. In particular, the object modifier 110 may be configured to determine such lighting attributes as the angle of lighting incident on the detected fashion accessory in the image, a color of the lighting incident on the detected fashion accessory in the image, and shading on the detected fashion accessory in the image. The object modifier 110 then reproduces these lighting attributes on the replacement fashion accessory to generate a modified replacement fashion accessory and performs virtual application of the modified replacement fashion accessory on the user to produce a more accurate depiction of the replacement fashion accessory in the image.

Figure 2:
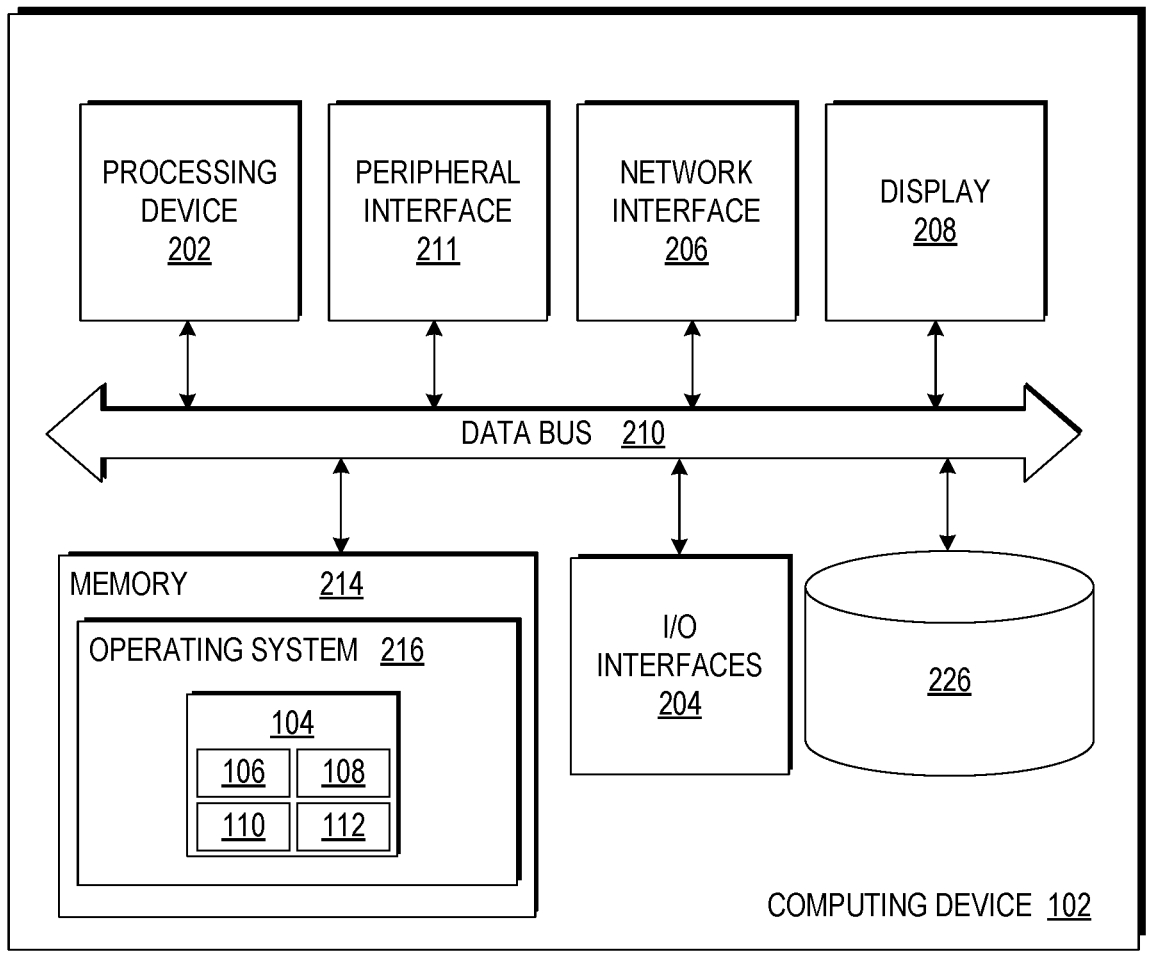
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include a custom made processor, a central processing unit (CPU), or an auxiliary processor among several processors associated with the computing device 102, a semiconductor based microprocessor (in the form of a microchip), a macroprocessor, one or more application specific integrated circuits (ASICs), a plurality of suitably configured digital logic gates, and so forth.

The memory 214 may include one or a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software that may comprise some or all the components of the computing device 102 displayed in FIG. 1.

In accordance with such embodiments, the components are stored in memory 214 and executed by the processing device 202, thereby causing the processing device 202 to perform the operations/functions disclosed herein. For some embodiments, the components in the computing device 102 may be implemented by hardware and/or software.

Input/output interfaces 204 provide interfaces for the input and output of data. For example, where the computing device 102 comprises a personal computer, these components may interface with one or more input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
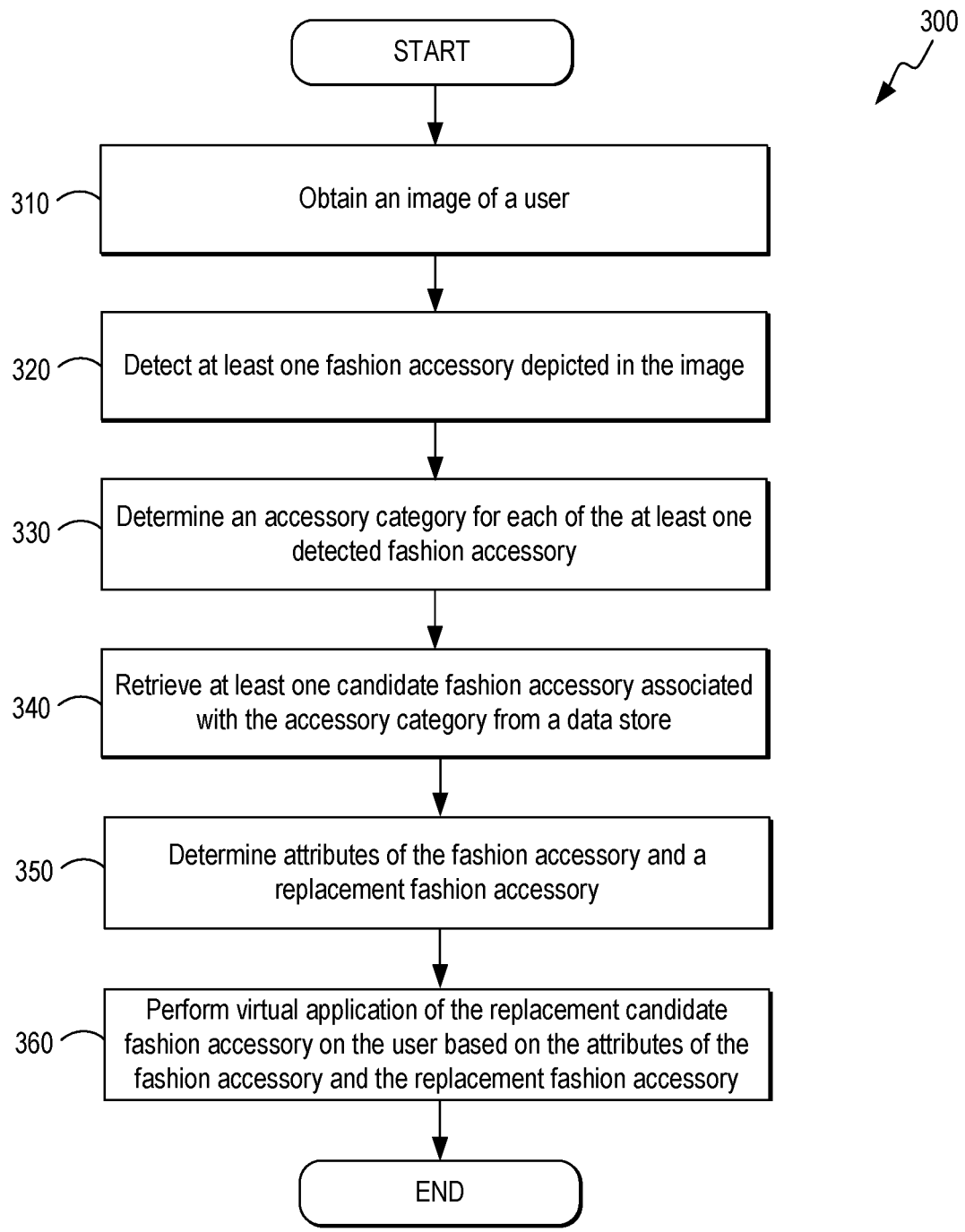
FIG. 3 is a top-level flowchart illustrating examples of functionality implemented as portions of the computing device of FIG. 1 for providing an accessory evaluation service according to various embodiments of the present disclosure.

Reference is made to FIG. 3, which is a flowchart 300 in accordance with various embodiments for providing an accessory evaluation service, where the operations are performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is displayed. For example, the order of execution of two or more blocks may be scrambled relative to the order shown. In addition, two or more blocks shown in succession in FIG. 3 may be executed concurrently or with partial concurrence. It is understood that all such variations are within the scope of the present disclosure.

Figure 11:
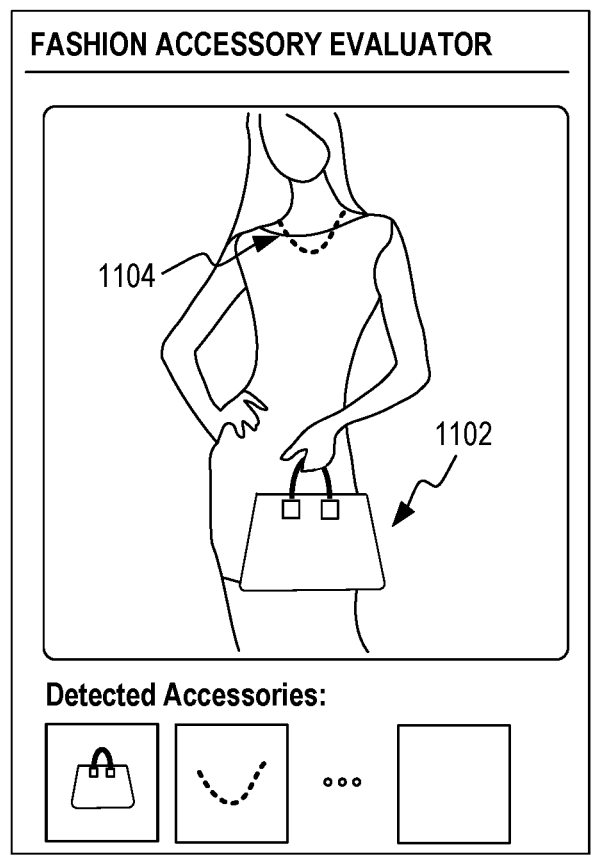
FIG. 11 illustrates detected fashion accessories being displayed based on a predefined priority according to various embodiments of the present disclosure.

At block 310, the computing device 102 obtains an image of a user. At block 320, the computing device 102 detects at least one fashion accessory depicted in the image. The fashion accessory may comprise, for example, a necklace, rings, earrings, bracelets, watches, hats, and/or a handbag. At block 330, the computing device 102 determines a fashion accessory category for each of the at least one detected fashion accessory. For some embodiments, when more than one fashion accessory is detected, the user is given the opportunity to select one or more of the detected fashion accessories to replace. For example, the detected fashion accessories may be highlighted or thumbnails representing the detected fashion accessories may be grouped together and displayed in the user interface, where the user is able to select one or more of the detected fashion accessories to replace. For some embodiments, the detected fashion accessories may be displayed in a particular order according to a desired priority set by the user. To illustrate, reference is made to FIG. 11, which shows detected fashion accessories being displayed based on a predefined priority. In the example shown, a thumbnail of a handbag 1102 is shown first on the left followed by thumbnail of a necklace 1104 and so on. The priority may be specified by the user or may be based on popularity. Note that other layouts may be used. For example, fashion accessories comprising handbags 1102 may be assigned a highest priority and shown at the top followed, for example, by necklaces 1104 and so on.

Referring back to FIG. 3, at block 340, the computing device 102 retrieves at least one candidate fashion accessory 118 associated with the accessory category from a data store. For some embodiments, an artificial intelligence (AI) engine executing in the computing device 102 retrieves the candidate fashion accessories 118 from the data store. Note that the data store is not limited to being implemented in the computing device 102 and may comprise cloud storage where the computing device 102 accesses data from the data store over a network.

For some embodiments, each candidate fashion accessory 118 in the data store has associated metadata where the metadata may include one or more labels or tags. For example, the metadata for a pearl necklace may include two labels—"pearl" and "necklace." For some embodiments, the AI engine may be configured to derive metadata describing the user's current makeup and clothing style to retrieve at least one candidate fashion accessory 118 associated with the accessory category from the data store. The metadata includes clothing styles that may be characterized as, for example, casual daily wear, luxury or party outfits, colorful clothing, and so on. When accessing the data store, the computing device 102 examines the metadata associated with each fashion accessory to identify suitable candidates. For example, the computing device 102 may determine the type or category of detected fashion accessory and perform a search in the data store for an associated label(s) using a keyword search or other search technique. Fashion accessories in the data store with label(s) that match that of the detected fashion accessory may be prioritized such that other fashion accessories in the data store with labels that only partially match may be assigned a lower priority when candidate fashion accessories are displayed to the user. The candidate fashion accessory with the highest priority may be shown at the top.

At block 350, the computing device 102 determines attributes of the fashion accessory and a replacement fashion accessory. For some embodiments, this comprises utilizing depth and size information derived by a front-facing camera of the computing device 102 to determine a size of the fashion accessory. For some embodiments, the computing device 102 determines the attributes of the fashion accessory and the replacement fashion accessory by determining a first area occupied by the detected fashion accessory in the image and determining a second area to be occupied by the replacement fashion accessory in the image. The computing device 102 determines a difference between the first area and the second area. The computing device 102 then performs virtual application of the replacement fashion accessory on the user based on the difference between the first area and the second area. In particular, the computing device 102 performs virtual application of the replacement fashion accessory on the user where inpainting is performed in an area around the replacement fashion accessory when the second area is less than the first area. On the other hand, the computing device 102 performs virtual application of the replacement fashion accessory on the user by covering the detected fashion accessory with the replacement fashion accessory when the second area is greater than the first area.

For some embodiments, the computing device 102 determines lighting attributes of the detected fashion accessory in the image and reproduces the lighting attributes on the replacement fashion accessory to generate a modified replacement fashion accessory. Virtual application of the modified replacement fashion accessory is then performed on the user. The lighting attributes can comprise, for example, the angle of lighting incident on the detected fashion accessory in the image, a color of the lighting incident on the detected fashion accessory in the image, and shading on the detected fashion accessory in the image. At block 360, the computing device 102 performs virtual application of the replacement fashion accessory on the user based on the attributes of the fashion accessory and the replacement fashion accessory. Thereafter, the process in FIG. 3 ends.

Figure 4:
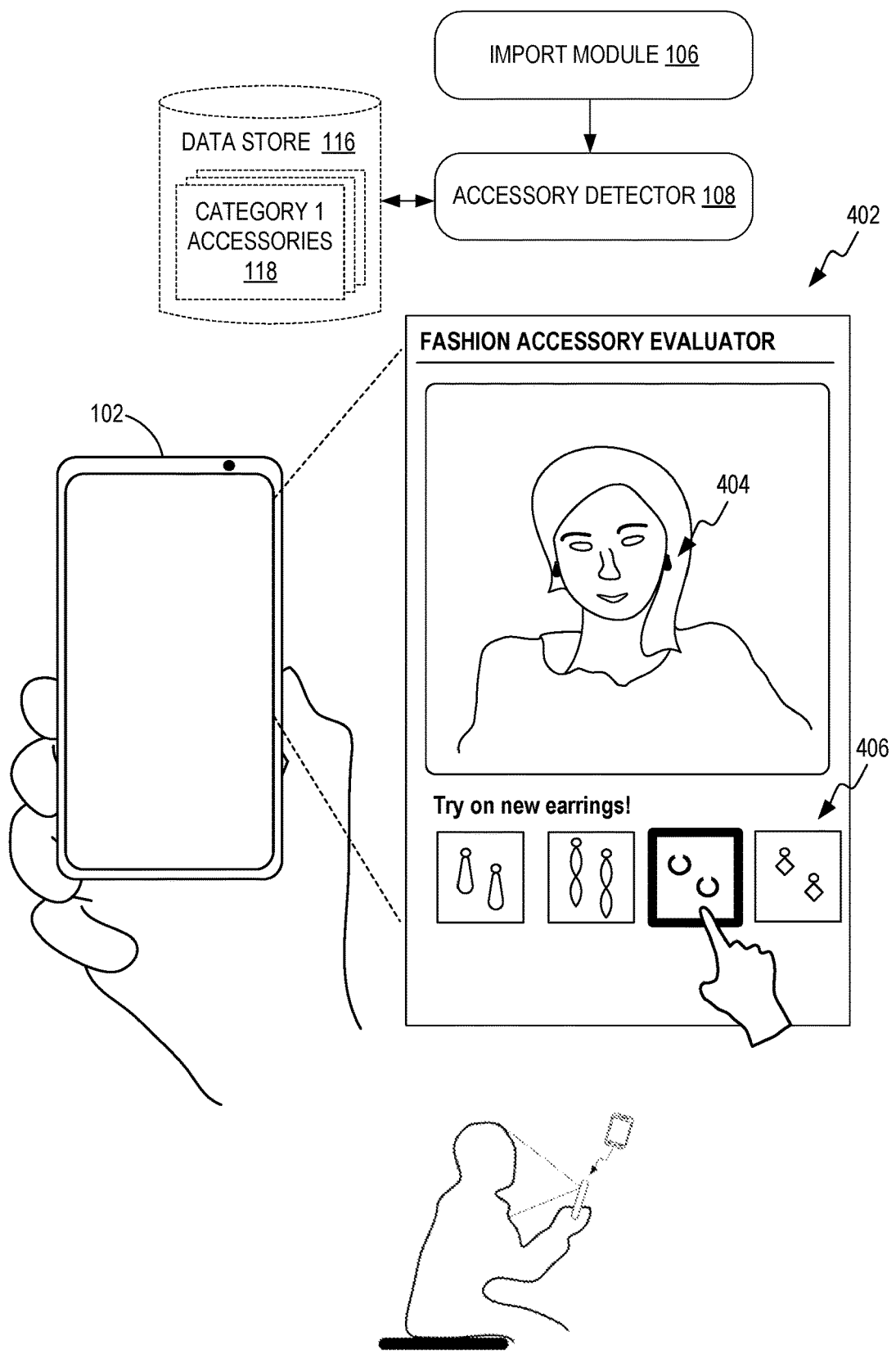
FIG. 4 illustrates an example user interface generated by the computing device of FIG. 1 according to various embodiments of the present disclosure.

To illustrate further various aspects of the present invention, reference is made to the following figures. FIG. 4 illustrates an example user interface 402 provided on a display of the computing device 102 whereby an image of the user is displayed. As described above, the import module 106 executing in the computing device 102 can be configured to cause a camera (e.g., front-facing camera) of the computing device 102 to capture an image or a video of a user of the computing device 102. The image depicts the user wearing a fashion accessory 404 (i.e., earrings). As described above, the accessory detector 108 executing in the computing device 102 detects the presence of one or more fashion accessories 404 currently worn by an individual depicted in an image. The computing device 102 then retrieves candidate fashion accessories 406 based on the one or more detected fashion accessories and presents the candidate fashion accessories to the individual, thereby giving the individual an opportunity to try on one or more replacement fashion accessories.

The individual selects a new fashion accessory and replaces the fashion accessory currently worn by the individual, thereby allowing the individual to try on new fashion accessories without actually purchasing the fashion accessories. In the example shown in FIG. 4, the computing device 102 detects the presence of earrings currently worn by the user. The computing device 102 then accesses the data store 116 and retrieves products that fall within the category of earrings. The retrieved earrings are then presented to the user in the user interface 402, and the user selects a desired set of replacement earrings.

Figure 5:
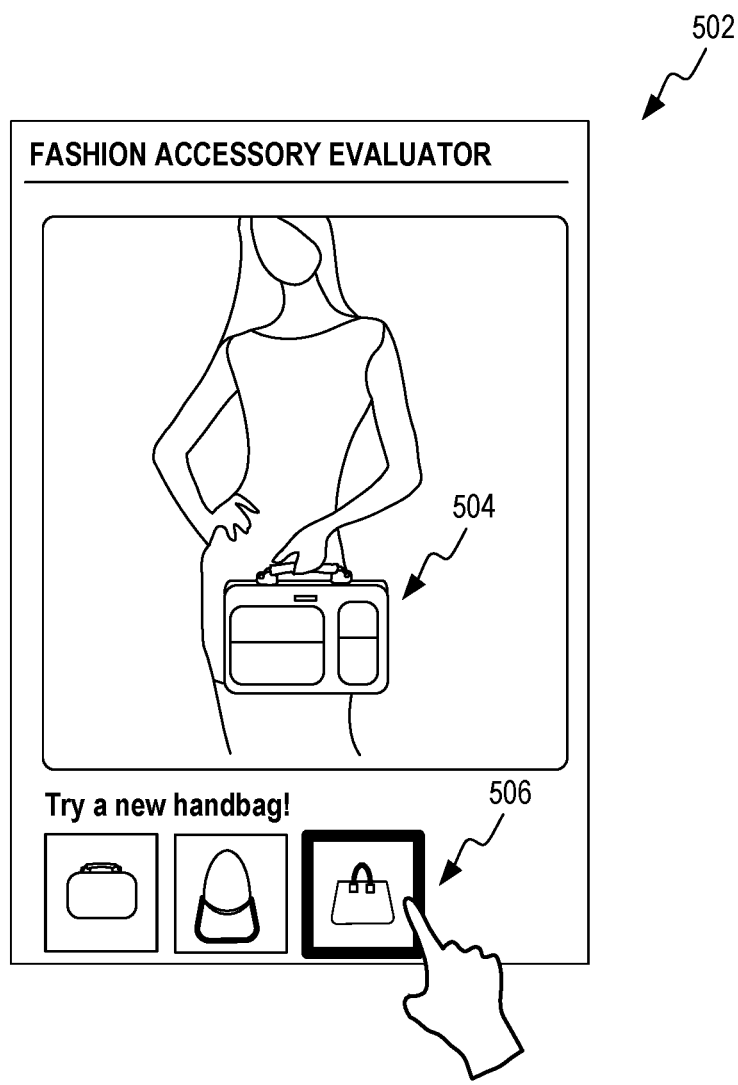
FIG. 5 illustrates another example user interface for selecting a replacement fashion accessory according to various embodiments of the present disclosure.

FIG. 5 illustrates another example user interface for selecting a replacement fashion accessory according to various embodiments of the present disclosure. The user interface 502 displays an image depicting the user wearing a fashion accessory 504 (i.e., handbag). As described above, the computing device 102 detects the presence of one or more fashion accessories 504 currently worn by an individual depicted in an image. The computing device 102 then retrieves candidate fashion accessories 506 based on the one or more detected fashion accessories and presents the candidate fashion accessories to the individual. By using a touchscreen interface or other input device, the individual selects a new fashion accessory and replaces the fashion accessory 504 currently worn by the individual, thereby allowing the individual to try on new fashion accessories without actually purchasing the fashion accessories. In the example shown in FIG. 5, the computing device 102 detects the presence of a handbag carried by the user. The computing device 102 then accesses the data store 116 (FIG. 1) and retrieves products that fall within the category of handbags. The retrieved handbags are then presented to the user, and the user selects a desired handbag to replace the handbag currently depicted in the image.

Figure 6:
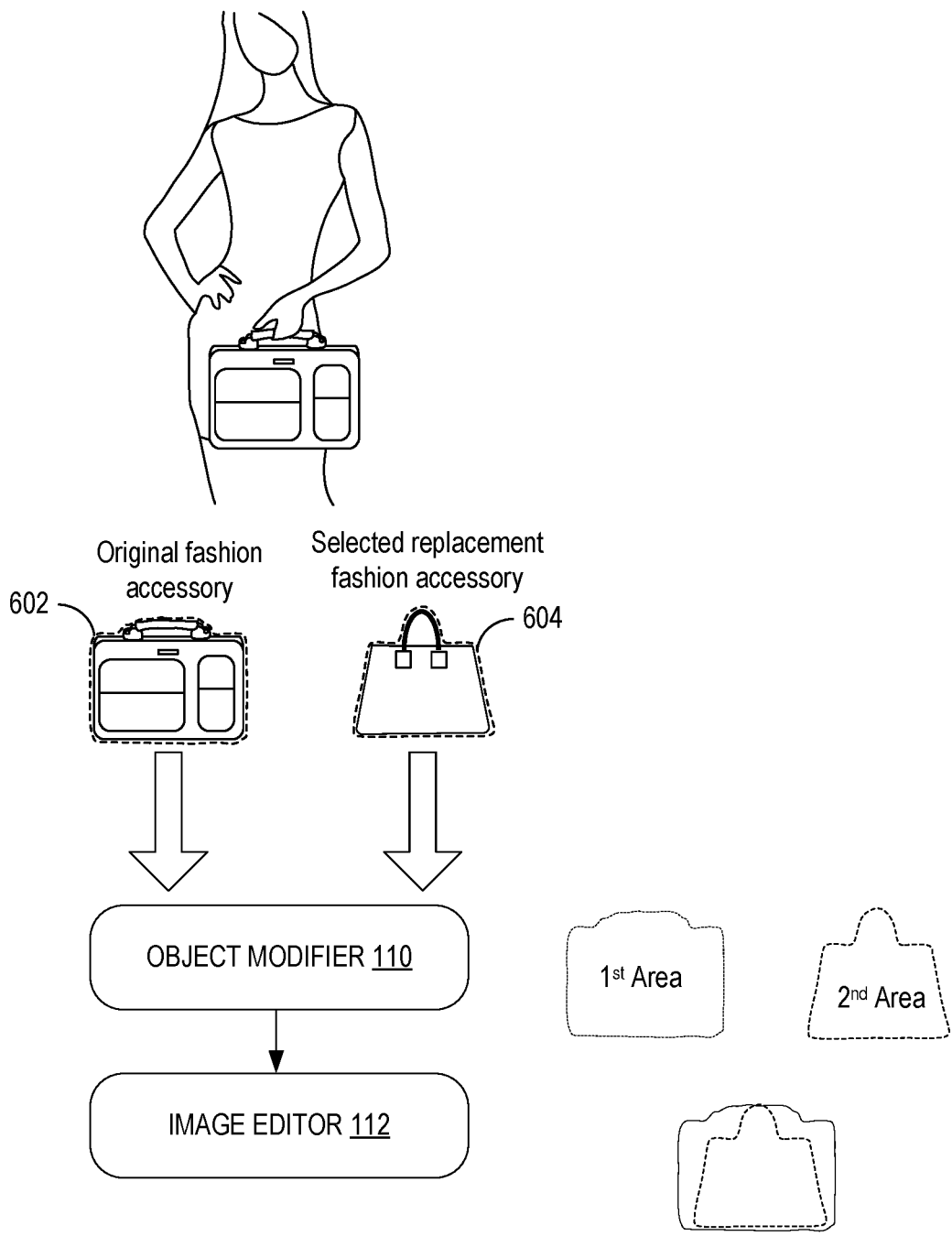
FIG. 6 illustrates determination of areas occupied by an original fashion accessory and a selected replacement fashion accessory according to various embodiments of the present disclosure.

FIG. 6 illustrates determination of areas occupied by an original fashion accessory and a selected replacement fashion accessory according to various embodiments of the present disclosure. Referring back to the example in FIG. 5, the user selects a replacement handbag from the candidate handbags presented to the user. Referring now to FIG. 6, the object modifier 110 described earlier determines a first area 602 in the image currently occupied by the original handbag. The object modifier 110 also determines a second area 604 to be occupied by the selected replacement handbag. As described above, the image editor 112 performs virtual application of the selected replacement handbag and performs other post-processing operations (e.g., inpainting) as needed.

Figure 7:
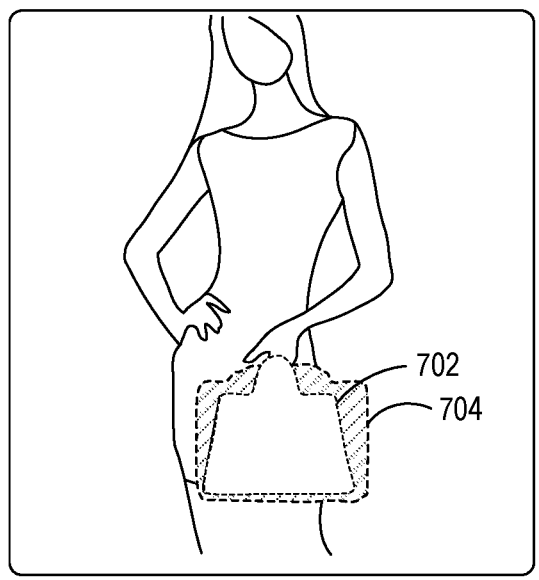
FIG. 7 illustrates the region in which inpainting is applied based on areas occupied by an original fashion accessory and a selected replacement fashion accessory according to various embodiments of the present disclosure.

FIG. 7 illustrates the region in which inpainting is applied based on areas occupied by an original fashion accessory and a selected replacement fashion accessory according to various embodiments of the present disclosure. As described above, the image editor 112 (FIG. 1) may perform virtual application of the replacement fashion accessory on the user by removing the detected fashion accessory and performing inpainting in an area around the selected replacement fashion accessory when the area 702 occupied by the selected replacement fashion accessory is less than the area 704 occupied by the original fashion accessory. Inpainting generally refers to the process of reconstructing lost or deteriorated parts of images and videos.

In the example shown, since removal of the original handbag from the image leaves a void larger than the area occupied by the selected replacement handbag, the image editor 112 performs inpainting to the shaded region shown in FIG. 7 in order to reconstruct portions of the image since voids still exist after the selected replacement handbag is virtually applied to the user. In the example shown in FIG. 7, the voids exist on portions of the user and the background region of the image.

Figure 8:
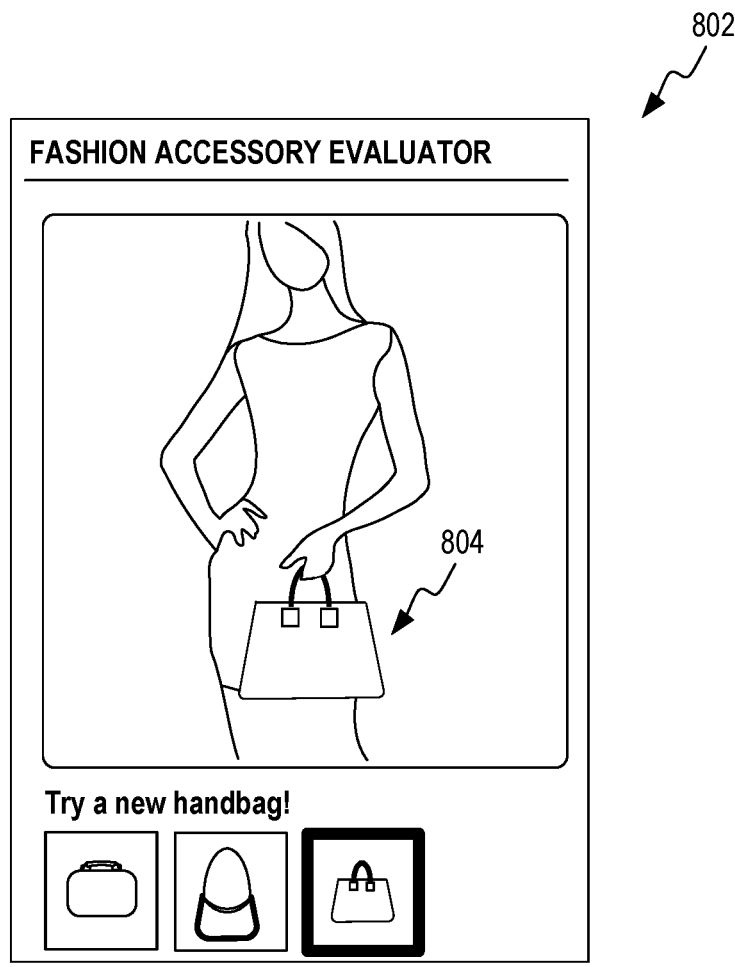
FIG. 8 illustrates virtual application of the selected replacement fashion accessory according to various embodiments of the present disclosure.

In some instances, virtual application of the selected replacement fashion accessory may involve the use of both inpainting and covering techniques where this depends, for example, on such attributes of the fashion accessories as the construction material (e.g., diamond, crystal), geometry (e.g., symmetric versus asymmetric construction), light transmission properties (e.g., opaque versus transparent), and so on. In particular, the use of both inpainting and covering techniques may be utilized if the fashion accessory being replaced differs significantly in size, construction material, etc. from the selected replacement fashion accessory. For example, suppose the user is initially wearing heart-shaped earrings and wishes to replace these earrings with long chain earrings. In this example, both inpainting and covering techniques are required during virtual application of the selected fashion accessory due to the difference in size and shape. As discussed above, however, the size and shape of the fashion accessories are not the only attributes taken into consideration during the virtual application process. Other attributes include the construction materials of the fashion accessories, the light transmission properties, and so on. FIG. 8 illustrates virtual application of the selected handbag after inpainting is performed by the image editor 112 (FIG. 1) according to various embodiments of the present disclosure.

Figure 9:
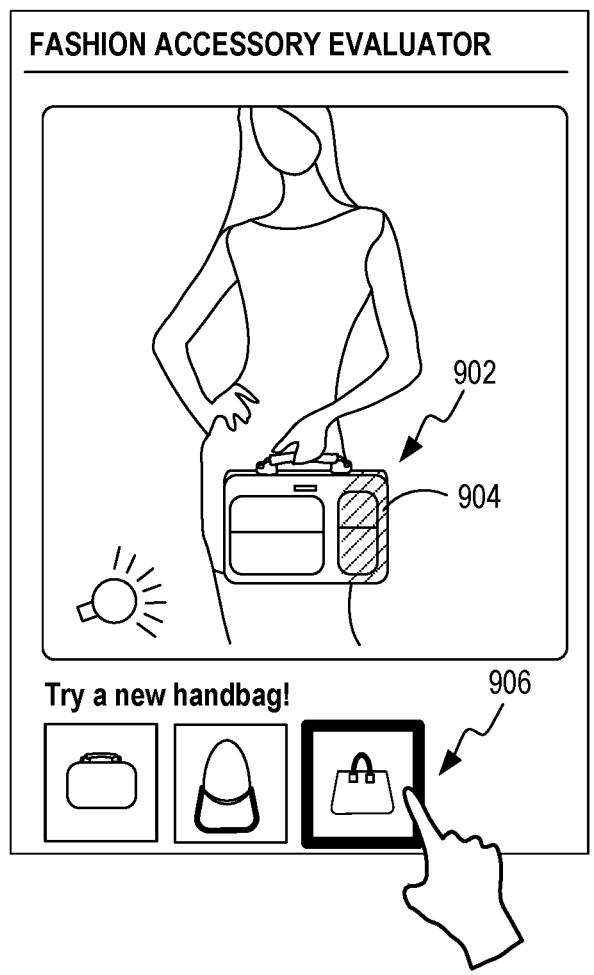
FIG. 9 illustrates lighting attributes associated with an original fashion accessory according to various embodiments of the present disclosure.

FIG. 9 illustrates lighting attributes associated with an original fashion accessory according to various embodiments of the present disclosure. As described above, the object modifier 110 (FIG. 1) may be configured to determine other attributes relating to the fashion accessory detected in the image of the individual. For some embodiments, the object modifier 110 is configured to determine lighting attributes that may include, for example, the angle of lighting incident on the detected fashion accessory in the image, a color of the lighting incident on the detected fashion accessory in the image, and shading on the detected fashion accessory in the image. In the example shown in FIG. 9, the location of a light source causes a portion 904 of the detected handbag 902 to be shaded. The user selects a replacement handbag from among candidate handbags 906 presented to the user.

Figure 10:
FIG. 10 illustrates duplication of the lighting attributes shown in FIG. 9 on the selected replacement fashion accessory according to various embodiments of the present disclosure.

FIG. 10 illustrates duplication of the lighting attributes shown in FIG. 9 on the selected replacement handbag according to various embodiments of the present disclosure. The object modifier 110 (FIG. 1) reproduces the lighting attributes detected for the original handbag on the selected replacement handbag 1002 to generate a modified replacement handbag 1002 and performs virtual application of the modified replacement handbag 1002 on the user to produce a more accurate depiction of the replacement handbag 1002 in the image whereby a portion 1004 of the replacement handbag 1002 is similarly shaded.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device, comprising:
    obtaining an image of a user;
    determining a fashion accessory category for each of at least one fashion accessory depicted in the image;
    retrieving at least one candidate fashion accessory associated with the fashion accessory category from a data store;
    determining attributes of the at least one fashion accessory and a replacement fashion accessory, wherein determining the attributes of the fashion accessory and the replacement fashion accessory comprises:
        determining a first area occupied by the at least one fashion accessory depicted in the image;
        determining a second area to be occupied by the replacement fashion accessory depicted in the image; and
        determining a difference between the first area and the second area, wherein virtual application of the replacement fashion accessory on the user is performed based on the difference between the first area and the second area; and
    performing virtual application of the replacement fashion accessory on the user based on the attributes of the at least one fashion accessory and the replacement fashion accessory, wherein performing virtual application of the replacement fashion accessory on the user comprises:
        performing inpainting in an area around the replacement fashion accessory; and
        performing virtual application of the replacement fashion accessory on the user after inpainting is performed in the area around the replacement fashion accessory.

2. The method of claim 1, further comprising obtaining a selection of one of the at least one candidate fashion accessory from the user as the replacement fashion accessory, wherein obtaining the selection comprises:
    displaying the at least one fashion accessory according to a predefined order of priority; and
    obtaining the selection among the displayed at least one fashion accessory.

3. The method of claim 1, wherein retrieving the at least one candidate fashion accessory associated with the fashion accessory category from the data store comprises:
    determining a label for each of the at least one fashion accessory;
    comparing metadata comprising a label of each candidate fashion accessory in the data store with each label of each of the at least one fashion accessory; and
    determining the at least one candidate fashion accessory based on the comparison.

4. The method of claim 1, wherein determining the attributes of the fashion accessory and the replacement fashion accessory comprises utilizing depth and size information derived by a front-facing camera of the computing device to determine a size of the at least one fashion accessory.

5. The method of claim 1, wherein performing virtual application of the replacement fashion accessory on the user based on the difference between the first area and the second area comprises:
   performing inpainting in an area around the replacement fashion accessory when the second area is less than the first area; and
   covering the at least one fashion accessory with the replacement fashion accessory when the second area is greater than the first area.

6. The method of claim 1, wherein performing virtual application of the replacement fashion accessory on the user based on the difference between the first area and the second area comprises:
   applying a covering technique and partial inpainting based on the difference of the first area and the second area when the second area is greater than the first area.

7. The method of claim 1, wherein the attributes of the fashion accessory and the replacement fashion accessory comprise each of: size and shape of the fashion accessory and the replacement fashion accessory, construction material of the fashion accessory and the replacement fashion accessory, geometry of the fashion accessory and the replacement fashion accessory, and light transmission properties of the fashion accessory and the replacement fashion accessory.

8. A method implemented in a computing device, comprising:
   obtaining an image of a user;
   determining a fashion accessory category for each of at least one fashion accessory depicted in the image;
   retrieving at least one candidate fashion accessory associated with the fashion accessory category from a data store;
   determining attributes of the at least one fashion accessory and a replacement fashion accessory, wherein determining the attributes of the fashion accessory and the replacement fashion accessory comprises:
      determining lighting attributes of the at least one fashion accessory depicted in the image;
      duplicating the lighting attributes on the replacement fashion accessory to generate a modified replacement fashion accessory; and
      performing virtual application of the modified replacement fashion accessory on the user; and
   performing virtual application of the replacement fashion accessory on the user based on the attributes of the at least one fashion accessory and the replacement fashion accessory.

9. The method of claim 8, wherein the lighting attributes comprise: angle of lighting incident on the at least one fashion accessory depicted in the image; a color of the lighting incident on the at least one fashion accessory depicted in the image; and shading on the at least one fashion accessory depicted in the image.

10. A system, comprising:
    a memory storing instructions;
    a processor coupled to the memory and configured by the instructions to at least:
       obtain an image of a user;
       determine a fashion accessory category for each of at least one fashion accessory depicted in the image;
       retrieve at least one candidate fashion accessory associated with the fashion accessory category from a data store;
       determine attributes of the at least one fashion accessory and a replacement fashion accessory, wherein the processor is configured to determine the attributes of the fashion accessory and the replacement fashion accessory by:
          determining a first area occupied by the at least one fashion accessory depicted in the image;
          determining a second area to be occupied by the replacement fashion accessory in the image; and
          determining a difference between the first area and the second area, wherein virtual application of the replacement fashion accessory on the user is performed based on the difference between the first area and the second area; and
       perform virtual application of the replacement fashion accessory on the user based on the attributes of the at least one fashion accessory and the replacement fashion accessory, wherein the processor is configured to perform virtual application of the replacement fashion accessory on the user by:
          performing inpainting in an area around the replacement fashion accessory; and
          performing virtual application of the replacement fashion accessory on the user after inpainting is performed in the area around the replacement fashion accessory.

11. The system of claim 10, wherein the processor is further configured to obtain a selection of one of the at least one candidate fashion accessory from the user as the replacement fashion accessory, wherein obtaining the selection comprises:
    displaying the at least one fashion accessory according to a predefined order of priority; and
    obtaining the selection among the displayed at least one fashion accessory.

12. The system of claim 10, wherein the processor is configured to retrieve the at least one candidate fashion accessory associated with the fashion accessory category from the data store by:
    determining a label for each of the at least one fashion accessory;
    comparing metadata comprising a label of each candidate fashion accessory in the data store with each label of each of the at least one fashion accessory; and
    determining the at least one candidate fashion accessory based on the comparison.

13. The system of claim 10, further comprising:
    a front-facing camera, wherein the processor is configured to determine the attributes of the at least one fashion accessory and the replacement fashion accessory by utilizing depth and size information derived by the front-facing camera to determine a size of the at least one fashion accessory.

14. The system of claim 10, wherein the processor is configured to determine the attributes of the fashion accessory and the replacement fashion accessory by:
    determining a first area occupied by the at least one fashion accessory depicted in the image;
    determining a second area to be occupied by the replacement fashion accessory in the image; and
    determining a difference between the first area and the second area, wherein virtual application of the replacement fashion accessory on the user is performed based on the difference between the first area and the second area.

15. A non-transitory computer-readable storage medium storing instructions to be implemented by a computing device having a processor, wherein the instructions, when executed by the processor, cause the computing device to at least:
  obtain an image of a user;
  determine a fashion accessory category for each of the at least one detected fashion accessory depicted in the image;
  retrieve at least one candidate fashion accessory associated with the fashion accessory category from a data store;
  determine attributes of the at least one fashion accessory and a replacement fashion accessory, wherein the processor is configured by the instructions to determine the attributes of the fashion accessory and the replacement fashion accessory by:
    determining a first area occupied by the fashion accessory in the image;
    determining a second area to be occupied by the replacement fashion accessory in the image; and
    determining a difference between the first area and the second area, wherein virtual application of the replacement fashion accessory on the user is performed based on the difference between the first area and the second area; and
  perform virtual application of the replacement fashion accessory on the user based on the attributes of the at least one fashion accessory and the replacement fashion accessory, wherein the processor is configured by the instructions to perform virtual application of the replacement fashion accessory on the user by:
    performing inpainting in an area around the replacement fashion accessory; and
    performing virtual application of the replacement fashion accessory on the user after inpainting is performed in the area around the replacement fashion accessory.

16. The non-transitory computer-readable storage medium of claim 15, wherein the processor is further configured by the instructions to obtain a selection of one of the at least one candidate fashion accessory from the user as the replacement fashion accessory, wherein obtaining the selection comprises:
  displaying the at least one fashion accessory according to a predefined order of priority; and
  obtaining the selection among the displayed at least one fashion accessory.

17. The non-transitory computer-readable storage medium of claim 15, wherein the processor is configured by the instructions to retrieve the at least one candidate fashion accessory associated with the fashion accessory category from the data store by:
  determining a label for each of the at least one fashion accessory;
  comparing metadata comprising a label of each candidate fashion accessory in the data store with each label of each of the at least one fashion accessory; and
  determining the at least one candidate fashion accessory based on the comparison.

18. The non-transitory computer-readable storage medium of claim 15, wherein the processor is configured by the instructions to determine the attributes of the fashion accessory and the replacement fashion accessory by utilizing depth and size information derived by a front-facing camera of the computing device to determine a size of the at least one fashion accessory.

19. A system, comprising:
  a memory storing instructions;
  a processor coupled to the memory and configured by the instructions to at least:
    obtain an image of a user;
    determine a fashion accessory category for each of the at least one fashion accessory depicted in the image;
    retrieve at least one candidate fashion accessory associated with the fashion accessory category from a data store;
    determine attributes of the at least one fashion accessory and a replacement fashion accessory, wherein the processor is configured to determine the attributes of the fashion accessory and the replacement fashion accessory by:
      determining lighting attributes of the at least one fashion accessory depicted in the image;
      duplicating the lighting attributes on the replacement fashion accessory to generate a modified replacement fashion accessory; and
      performing virtual application of the modified replacement fashion accessory on the user; and
    perform virtual application of the replacement fashion accessory on the user based on the attributes of the at least one fashion accessory and the replacement fashion accessory.

20. A non-transitory computer-readable storage medium storing instructions to be implemented by a computing device having a processor, wherein the instructions, when executed by the processor, cause the computing device to at least:
  obtain an image of a user;
  determine a fashion accessory category for each of the at least one fashion accessory depicted in the image;
  retrieve at least one candidate fashion accessory associated with the fashion accessory category from a data store;
  determine attributes of the fashion accessory and a replacement fashion accessory, wherein the processor is configured by the instructions to determine the attributes of the at least one fashion accessory and the replacement fashion accessory by:
    determining lighting attributes of the at least one fashion accessory depicted in the image;
    duplicating the lighting attributes on the replacement fashion accessory to generate a modified replacement fashion accessory; and
    performing virtual application of the modified replacement fashion accessory on the user; and
  perform virtual application of the replacement fashion accessory on the user based on the attributes of the at least one fashion accessory and the replacement fashion accessory.

* * * * *